United States Patent Office 2,888,409
Patented May 26, 1959

2,888,409

PRODUCTION OF FLEXIBLE CELLULAR POLYURETHANE MATERIAL

Newell R. Bender, Cuyahoga Falls, and Thomas H. Rogers, Jr., Akron, Ohio, assignors to The Goodyear Tire & Rubber Company, Akron, Ohio, a corporation of Ohio No Drawing. Application March 21, 1955
Serial No. 495,810

2 Claims. (Cl. 260—2.5)

This invention relates to the preparation of flexible, cellular materials. More particularly, it relates to improved methods for producing flexible, elastomeric, cellular structures from liquid reaction mixtures containing polyisocyanates and to improved products obtained by the use of these methods.

The production of flexible, cellular structures from liquid polymeric reaction mixtures containing polyisocyanates is a relatively recent development. The reaction mixtures from which the cellular structures are made contain polymeric materials which are either liquid at room temperature or capable of being melted at relatively low temperatures. The polymeric materials contain active-hydrogen atoms which react with the isocyanate groups to form a network of cross-linked molecular chains. The polyisocyanate not only functions as a cross-linker or curative for the polymeric material but also reacts with water provided in the liquid reaction mixture to form carbon dioxide which causes the liquid reaction mixture to expand and foam, with resultant formation of a flexible, cellular structure which retains its foamed cellular character after the polymer has been cross-linked.

The reaction between the isocyanate and water to form carbon dioxide and the reaction between the polyisocyanate and the polymeric material to effect a cure of the polymeric material take place concurrently. However, it is difficult to control the individual rates of reaction so that ideal conditions exist. For instance, if substantial carbon dioxide generation occurs before the polymeric material cures sufficiently to develop internal strength, the gas rises to the surface and escapes. On the other hand, if the curing reaction takes place too rapidly, structural strength develops in the polymer to a degree which hinders the subsequent generation, expansion and movement of the gas, with the result that a non-uniform cellular structure develops. It has been observed that when the carbon dioxide is generated before the liquid reaction mixture starts to cure, a relatively thick, substantially non-cellular skin is formed at the surface of the reaction mixture, evidently because the $CO_2$ has escaped from the still fluid mixture. This thick skin must be trimmed from the finished product with the result that substantial waste is involved.

It is, therefore, an object of this invention to provide a method for producing flexible, cellular structures from reaction mixtures containing water, polyisocyanate and an active-hydrogen-containing polymeric material whereby the formation of a thick skin in the upper layer of the finished structure is avoided or minimized. Another object is to minimize the amount of uncured material which must be trimmed from the finished cellular structure. Still another object is to minimize the amount of carbon dioxide which is generated only to be lost to the finished product by rising to the surface of the reaction mixture and escaping. Still another object is to produce flexible, cellular structures having a more uniform pore size. Other objects will appear as the description proceeds.

The objects of this invention are accomplished by exposing the reaction mixture comprising the active-hydrogen-containing polymeric material, a polyisocyanate and water to an atmosphere containing ammonia while the reaction mixture is still foaming and curing or setting.

The practice of this invention is generally applicable to the production of flexible, cellular strucutres from reaction mixtures which contain an active-hydrogen-containing polymeric material, a polyisocyanate and water. By the term "active-hydrogen" is meant those hydrogen atoms which are reactive as detected and determined by the Zerewitinoff method.

Examples of the active-hydrogen-containing polymeric materials are polyesters, polyesteramides, polyalkylene ether glycols, and mixtures of two or more of these. The polyesters and polyesteramides are preferably formed from bifunctional materials such as dibasic carboxylic acids, amino carboxylic acids, glycols, amino alcohols and diamines. Small amounts of trifunctional materials may optionally be employed in preparing the active-hydrogen-containing polymeric materials. Polyesters and polyesteramides having an average molecular weight of from approximately 1000 to 5000, an acid number not greater than 5, and a hydroxyl number from 20 to 110, are preferred.

Any dibasic carboxylic acid, preferably those whose carboxyl groups are attached to terminal carbons, may be used to form the polyester or polyesteramide, including succinic, glutaric, adipic, pimelic, suberic, azelaic, sebacic, malonic, brassylic, tartaric, maleic, malic, fumaric, dilinoleic, thiodibutyric, diphenic, isophthalic, terephthalic, hexahydroterephthalic, p-phenylene diacetic, dihydromuconic, and beta-methyladipic acids.

Any glycol may be used in the formation of the polyester including ethylene, propylene 1,2; propylene 1,3; diethylene, triethylene, butylene, pentamethylene, hexamethylene, decamethylene, dodecamethylene, and N,N-diethanolaniline, glycerine mono ethers, and thiodiglycol.

Any amino alcohol having at least one hydrogen atom attached to the amino nitrogen atom may be employed including ethanolamine, 3 amino-propanol, 4 amino-butanol, 6 amino-hexanol, and 10 amino-decanol.

Examples of the diamines which may be used are ethylene, propylene 1,2, tetramethylene 1,4, hexamethylene 1,6, decamethylene 1,10, piperazine, isopropyl amino propyl amine, and 3,3' diamino dipropyl ether. Listed below are the reactants which are used to form particular polyesters and polyesteramides:

(1) Ethylene glycol plus adipic acid.
(2) Propylene glycol 1,2 plus adipic acid.
(3) Ethylene glycol (80 mol percent) propylene glycol 1,2 (20 mol percent) plus adipic acid.
(4) Ethylene glycol (80 mol percent) propylene glycol 1,2 (20 mol percent) plus azelaic acid.
(5) Ethylene glycol (80 mol percent), propylene glycol 1,2 (20 mol percent) plus sebacic acid.
(6) Ethylene glycol (80 mol percent), propylene glycol 1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol 1,4 (20 mol percent) plus adipic acid.
(9) Ethylene glycol (80 mol percent), propylene glycol 1,3 (20 mol percent) plus adipic acid.
(10) Ethylene glycol (80 mol percent), pentane diol 1,5 (20 mol percent) plus adipic acid.
(11) Ethylene glycol (80 mol percent) glycerine monoisopropyl ether (20 mol percent) plus adipic acid.
(12) Ethylene glycol (80 mol percent), propylene glycol 1,2 (from 18 to 5 mol percent), ethanol amine (from 2 to 15 mol percent) plus adipic acid.

(13) Ethylene glycol (80 mol percent), propylene glycol 1,2 (20 mol percent) plus maleic acid (from 3 to 6 mol percent), adipic acid (from 97 to 94 mol percent).

(14) Ethylene glycol (80 mol percent) propylene glycol 1,2 (from 19 to 17 mol percent), piperazine (from 1 to 3 mol percent) plus adipic acid.

(15) Ethylene glycol (80 mol percent), propylene glycol 1,3 (from 18 to 5 mol percent), dihydroxyethyl aniline (from 2 to 15 mol percent) plus adipic acid.

(16) Ethylene glycol (80 mol percent), butylene glycol 1,4 (20 mol percent) plus adipic acid.

(17) Ethylene glycol (80 mol percent), diethylene glycol (20 mol percent) plus adipic acid.

(18) Ethylene glycol (from 90 to 10 mol percent) propylene glycol 1,2 (from 10 to 90 mol percent) plus adipic acid.

(19) Ethylene glycol (from 90 to 10 mol percent), propylene glycol 1,2 (from 10 to 90 mol percent) plus azelaic acid.

Any organic polyisocyanate or mixtures of polyisocyanates may be employed. The amount of polyisocyanate should be at least sufficient to cross link the active-hydrogen-containing polymeric material and to react with the water present to form carbon dioxide gas. In general, it is preferred to use from 2 to 8 equivalents of isocyanate per mol of polymeric material. Representative examples of polyisocyanates which may be employed are the diisocyanates, such as hexamethylene diisocyanate, para-phenylene diisocyanate, meta-phenylene diisocyanate, 4,4'-diphenylene diisocyanate, 1,5-naphthalene diisocyanate, 4,4'-diphenylene methane diisocyanate, the tolylene diisocyanates, 4,4'-diphenyl ethyl diisocyanate, 3,3'-dimethyl 4,4'-diphenyl diisocyanate, and 3,3'-dimethoxy 4,4'-diphenyl diisocyanate; the triisocyanates, such as 4,4',4''-triphenyl methane triisocyanate, and toluene 2,4,6 triisocyanate, the tetraisocyanates, such as 4,4'-dimethyl-diphenyl methane 2,2',5,5' tetraisocyanate; and mixtures of polyisocyanates, such as those described in U.S. Patent 2,683,730. Of these, 3,3'-dimethyl 4,4'-diphenyl diisocyanate, 3,3'-dimethoxy 4,4'-diphenyl diisocyanate and the tolylene diisocyanates are particularly preferred.

The water in the reaction mixture is provided to form the carbon dioxide gas for foaming as well as to form possible points of cross-linking the polymeric material.

Further examples of active-hydrogen-containing polymeric materials and polyisocyanates as well as a discussion of the chemical reactions involved will be found in United States Patent No. 2,625,535, an article in Rubber Chemistry and Technology for October-December 1950, pages 812–834. The polyalkylene ether glycols are polyethers derived from alkylene oxides or glycols or from other heterocyclic ethers such as dioxolane. These materials may be represented by the formula $HO(RO)_nH$ in which R represents an alkylene radical such as methylene, ethylene or propylene and $n$ is an integer greater than 1. These glycols are either viscous liquids or waxy solids capable of being melted at relatively low temperatures. Further examples of the polyalkylene ether glycols such as the polyethylene ether glycols, the polypropylene ether glycols, and the polybutylene ether glycols and methods for their preparation are described in United States Patents 2,692,873 and 2,702,797.

In addition to the three ingredients discussed above, the reaction mixture may optionally contain pigment fillers, reinforcing agents, coloring agents, antioxidants, and accelerators.

The practice of this invention is illustrated with reference to the following example in which, unless otherwise indicated, parts are shown by weight.

*Example 1*

A polyester (150 parts) prepared from adipic acid, 80 mol percent of ethylene glycol and 20 mol percent of propylene glycol and having a hydroxyl number of 62.0, an acid number of 1.7 and an average molecular weight of 1760 was mixed successively with 3.1 parts of water, 25 parts of diatomaceous earth, 1.5 parts of a butyraldehyde/butylamine condensation product and 44.3 parts of tolylene diisocyanate. The butyraldehyde/butylamine condensation product, which functions as a catalyst for the reaction, was prepared from approximately 4 mols of butyraldehyde and 1 mol of butylamine. These condensation products and methods for their preparation are described in "The Journal of American Chemical Society," vol. 70, page 1624, for April 1948. The ingredients were thoroughly mixed after which they were poured into two aluminum molds.

One of the aluminum molds was allowed to remain at room temperature exposed only to the atmosphere. The second mold was placed under a beaker with a solution of approximately 7% of ammonium hydroxide also enclosed under the beaker. Both samples foamed well and set within fifteen minutes. The samples were cut, and it was observed that the sample exposed only to air had a rather thick skin (approximately 0.045 inch thick) on the upper surface of the cured sample. In order to permit this sample to function satisfactorily as a cushioning material it was necessary to cut the relatively thick skin from the surface to allow the cellular structure to breathe, i.e., to provide for the unrestricted passage of air in and out of the structure when in use. On the other hand, the sample cured in the ammonia vapor atmosphere had a very thin skin on its surface (approximately 0.010 inch thick) which formed almost immediately after the sample was placed in the beaker and appeared to prevent further thickening of such skin. The concentration of ammonia in the atmosphere surrounding the foaming and curing reactions is not critical in the practice of this invention, although high concentrations cause the thin skin to form more rapidly.

It will thus be seen that by exposing the reaction mixture to an atmosphere containing amomnia while the gas is being generated and while the polymer is being cured, it is possible to produce a protective skin over the reaction mixture almost immediately after the foaming and curing reactions are initiated, which thin skin prevents subsequently generated gas from escaping from the reaction mixture. By "trapping" the generated gas in this manner, only a minimum amount of trimming is necessary and the cured structure has a more uniform pore size.

While certain representative embodiments and details have been shown for the purpose of illustrating the invention, it will be apparent to those skilled in this art that various changes and modifications may be made therein without departing from the spirit or scope of the invention.

We claim:

1. The process of manufacturing a flexible cellular structure which comprises forming a mixture of water, an active-hydrogen-containing polymeric material having an average molecular weight of from 1000 to 5000 and an amount of organic polyisocyanate providing from 2 to 8 equivalents of isocyanate per mol of polymeric material and permitting said mixture to foam and set in an atmosphere containing ammonia for sufficient time and at such concentration of ammonia as to minimize the formation of non-cellular skin on the upper surface of the foamed reaction mixture, the foaming being accomplished by the generation of carbon dioxide in situ, said active-hydrogen-containing polymeric material being selected from the group consisting of polyalkylene ether glycols, polyesters prepared from the condensation reaction between at least one dicarboxylic acid and at least one glycol and polyesteramides prepared from the condensation reaction between at least one dicarboxylic acid, at least one glycol and at least one amino compound selected from the group consisting of amino carboxylic acids, amino alcohols and diamines, said polyesters and polyesteramides having an acid number not greater than 5.

2. A process defined by claim 1 in which the polyisocyanate is tolylene diisocyanate.

References Cited in the file of this patent

UNITED STATES PATENTS

| | | |
|---|---|---|
| 2,657,151 | Gensel et al. | Oct. 27, 1953 |
| 2,721,811 | Dacey et al. | Oct. 25, 1955 |